(12) United States Patent
Nivala et al.

(10) Patent No.: US 10,719,487 B2
(45) Date of Patent: Jul. 21, 2020

(54) METHOD, AN APPARATUS, A COMPUTER PROGRAM PRODUCT FOR DETERMINING METADATA FOR A DATA ITEM

(71) Applicant: M-Files Oy, Tampere (FI)

(72) Inventors: Antti Nivala, Pirkkala (FI); Gregory C. Milliken, Austin, TX (US); Mikko Rantanen, Tampere (FI); Jyri Mantysalo, Tampere (FI)

(73) Assignee: M-FILES OY (FI)

( * ) Notice: Subject to any disclaimer, the term of this patent is extended or adjusted under 35 U.S.C. 154(b) by 1018 days.

(21) Appl. No.: 15/010,209

(22) Filed: Jan. 29, 2016

(65) Prior Publication Data

US 2017/0220604 A1 Aug. 3, 2017

(51) Int. Cl.
| | | |
|---|---|---|
| *G06F 16/38* | (2019.01) | |
| *G06F 16/21* | (2019.01) | |
| *G06F 16/332* | (2019.01) | |
| *G06Q 10/10* | (2012.01) | |
| *G06F 16/00* | (2019.01) | |
| *G06F 16/16* | (2019.01) | |
| *G06F 16/383* | (2019.01) | |
| *G06F 3/0484* | (2013.01) | |

(52) U.S. Cl.
CPC ........ *G06F 16/211* (2019.01); *G06F 3/04842* (2013.01); *G06F 16/00* (2019.01); *G06F 16/164* (2019.01); *G06F 16/3322* (2019.01); *G06F 16/38* (2019.01); *G06F 16/383* (2019.01); *G06Q 10/10* (2013.01)

(58) Field of Classification Search
CPC .... G06F 16/164; G06F 17/3012; G06F 16/38; G06F 16/383; G06F 16/48; G06F 16/483; G06F 16/58; G06F 16/583; G06F 16/68; G06F 16/683; G06F 16/78; G06F 16/783; G06F 16/907; G06F 16/908
See application file for complete search history.

(56) References Cited

U.S. PATENT DOCUMENTS

| | | | |
|---|---|---|---|
| 7,844,582 B1* | 11/2010 | Arbilla | G06F 21/554 707/694 |
| 8,392,472 B1* | 3/2013 | Gupta | G06F 17/30115 707/804 |
| 8,838,597 B1* | 9/2014 | Gottumukkala | G06F 17/30946 707/736 |
| 2005/0289193 A1* | 12/2005 | Arrouye | G06F 17/30126 |
| 2007/0078885 A1* | 4/2007 | Klein, Jr. | G06F 17/30038 |
| 2007/0143286 A1* | 6/2007 | Kim | G06F 17/3012 |
| 2007/0185829 A1* | 8/2007 | Jansen | G06F 17/3012 |
| 2007/0255760 A1* | 11/2007 | Itoh | G06F 17/3012 |
| 2009/0150464 A1* | 6/2009 | Jang | G06F 17/30218 |
| 2011/0078114 A1 | 3/2011 | Herbeck et al. | |

(Continued)

*Primary Examiner* — Robert W Beausoliel, Jr.
*Assistant Examiner* — Nirav K Khakhar
(74) *Attorney, Agent, or Firm* — Ware, Fressola, Maguire & Barber LLP

(57) ABSTRACT

The invention relates to a method, an apparatus, a computer program product for determining metadata for a data item. The method comprises receiving a data item for processing; analyzing content of the data item; generating a set of metadata values based on the analysis of the content of the data item; and using at least a part of the set of metadata values for defining metadata for the data item.

25 Claims, 6 Drawing Sheets

(56) References Cited

U.S. PATENT DOCUMENTS

| | | | | |
|---|---|---|---|---|
| 2011/0307451 | A1* | 12/2011 | El Haddi | G06F 17/30073 |
| | | | | 707/673 |
| 2012/0117484 | A1* | 5/2012 | Convertino | G06F 17/30864 |
| | | | | 715/744 |
| 2012/0179702 | A1* | 7/2012 | Nozaki | G06F 17/30997 |
| | | | | 707/758 |
| 2012/0278705 | A1* | 11/2012 | Yang | G06F 16/38 |
| | | | | 715/254 |
| 2013/0036117 | A1* | 2/2013 | Fisher | G06F 17/30029 |
| | | | | 707/736 |
| 2013/0103642 | A1* | 4/2013 | Zhang | G06F 17/3012 |
| | | | | 707/609 |
| 2014/0258316 | A1 | 9/2014 | O'Hagan et al. | |
| 2016/0210355 | A1* | 7/2016 | Krantz, III | G06F 16/34 |

\* cited by examiner

METHOD, AN APPARATUS, A COMPUTER PROGRAM PRODUCT FOR DETERMINING METADATA FOR A DATA ITEM

TECHNICAL FIELD

The present embodiments generally relate to the field of content management systems. In particular, the present embodiments relate to a method for determining metadata for data items being stored in a content management system.

BACKGROUND

An Enterprise Content Management (ECM) system, also known as an Enterprise Information Management (EIM) system, refers to a system for organizing and storing an organization's electronic documents and other business-related data and/or content. ECM systems may comprise content management systems (CMS), document management systems (DMS), and data management systems. Such systems comprise various features for managing electronic documents and data, e.g., storing, versioning, indexing, searching for, and retrieval of documents.

SUMMARY

Now there has been invented an improved method and technical equipment implementing the method, by which business critical metadata can be efficiently determined for data items residing in a content management system or a data repository. Various aspects of the invention include a method, an apparatus, a server, a client and a computer readable medium comprising a computer program stored therein, which are characterized by what is stated in the independent claims. Various embodiments of the invention are disclosed in the dependent claims.

According to a first aspect, there is provided a method, comprising: receiving a data item for processing; analyzing content of the data item; generating a set of metadata values based on the analysis of the content of the data item; and using at least a part of the set of metadata values for defining metadata for the data item.

According to an embodiment, the content of the data item is analyzed by using an external service.

According to an embodiment the method further comprises filling at least one metadata value automatically to a property of the generated metadata of the data item.

According to an embodiment the method further comprises generating a set of suggestions from at least one metadata value for a property of the generated metadata of the data item.

According to an embodiment the method further comprises displaying the set of suggestions to a user.

According to an embodiment the method further comprises receiving a confirmation from a user, the confirmation relating to one of the metadata values in said set of the suggestions.

According to an embodiment the method further comprises filling said one of the metadata values to a property of the generated metadata of the data item.

According to an embodiment the method further comprises creating a new object concerning at least one of the metadata values in said set of metadata values, said new object comprising at least one metadata property.

According to an embodiment the method further comprises determining a value for said at least one metadata property by receiving information from an information service.

According to an embodiment, the data item being processed is stored in a data repository connected to the content management system.

According to an embodiment, the data item being processed is stored in an internal data storage of the content management system.

According to an embodiment, the data item being processed is received from a user to be stored in the content management system.

According to a second aspect, there is provided an apparatus comprising at least one processor, memory including computer program code, the memory and the computer program code configured to, with the at least one processor, cause the apparatus to perform at least the following: receive a data item for processing; analyze content of the data item; generate a set of metadata values based on the analysis of the content of the data item; and use at least a part of the set of metadata values for defining metadata for the data item.

According to an embodiment, the content of the data item is analyzed by using an external service.

According to an embodiment, the apparatus further comprises computer program code to cause the apparatus to fill at least one metadata value automatically to a property of the generated metadata of the data item.

According to an embodiment, the apparatus further comprises computer program code to cause the apparatus to generate a set of suggestions from at least one metadata value for a property of the generated metadata of the data item.

According to an embodiment, the apparatus further comprises computer program code to cause the apparatus to display the set of suggestions to a user.

According to an embodiment, the apparatus further comprises computer program code to cause the apparatus to receive a confirmation from a user, the confirmation relating to one of the metadata values in said set of the suggestions.

According to an embodiment, the apparatus further comprises computer program code to cause the apparatus to fill said one of the metadata values to a property of the generated metadata of the data item.

According to an embodiment, the apparatus further comprises computer program code to cause the apparatus to create a new object concerning at least one of the metadata values in said set of metadata values, said new object comprising at least one metadata property.

According to an embodiment, the apparatus further comprises computer program code to cause the apparatus to determine a value for said at least one metadata property by receiving information from an information service.

According to an embodiment, the data item being processed is stored in a data repository connected to the content management system.

According to an embodiment, the data item being processed is stored in an internal data storage of the content management system.

According to an embodiment, the data item being processed is received from a user to be stored in the content management system.

According to a third aspect, there is provided a computer program product embodied on a non-transitory computer readable medium, comprising computer program code configured to, when executed on at least one processor, cause an apparatus or a system to: receive a data item for processing; analyze content of the data item; generate a set of metadata values based on the analysis of the content of the data item; and use at least a part of the set of metadata values for defining metadata for the data item.

DESCRIPTION OF THE DRAWINGS

In the following, various embodiments of the invention will be described in more detail with reference to the appended drawings, in which.

DESCRIPTION OF EXAMPLE EMBODIMENTS

Figures 1, 2:
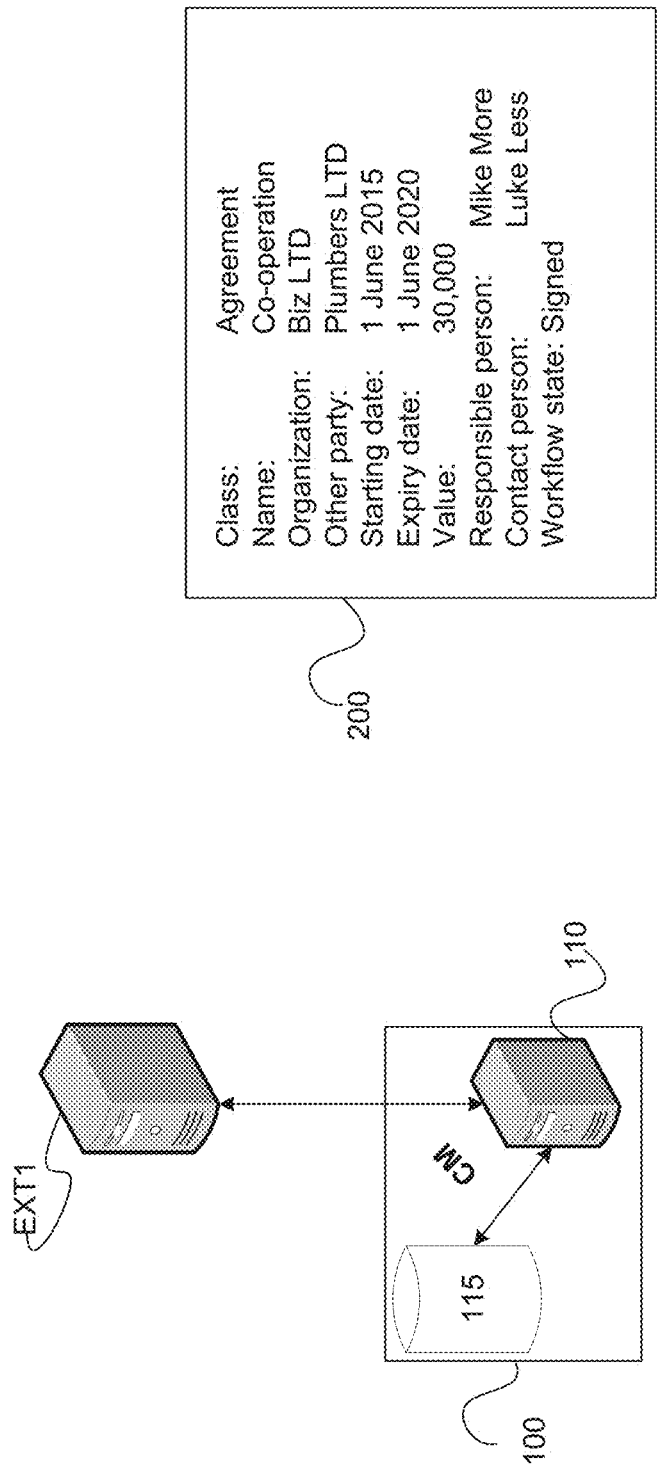
FIG. 1 shows an embodiment of a system in a simplified manner.
FIG. 2 shows a metadata card according to an embodiment.

The present embodiments relate to a content management system. The embodiments may also be utilized in a centralized content management system. The embodiments being discussed in this application represent functionalities of the content management system. It is appreciated that the content management system may contain one or more of the discussed functionalities, which means that the discussed embodiments may be combined to enhance the operation of the content management system.

In relation to an enterprise content management system, the term "content" often refers to unstructured data only (e.g., documents). In the present application, the term "content" refers to both structured data, such as business objects (e.g., Customer, Project, Order, Case, Claim, etc. stored and/or processed in an enterprise resource planning (ERP) system, a customer relationship management (CRM) system, and other business systems based on a database), and unstructured data, such as documents, files, and other content in semi-structured or unstructured format. Thus, in this application, the term "content" refers to any data, including but not limited to documents, files, objects, and other data items. The terms "data" and "content" are used interchangeably in this application. Similarly, terms like "data item" and "content item" are used interchangeably. Further, the term "object" may be used interchangeably with the term "data item."

In the following description, in the context of a centralized content management system, the term "data repository" is used for defining "a system that stores and/or manages data", i.e. "a data vault", "a data storage", "an external data storage", "an external data repository", or "a repository". A data repository may be an enterprise content management system, an enterprise information management system, a document management system, an enterprise file synchronization and sharing (EFSS) system, a network file system, any file system, an enterprise resource planning (ERP) system, a customer relationship management (CRM) system, a business data system, a database system, an e-mail archive or other e-mail management system, a mail source etc. A data repository may also be a part of any of the aforementioned systems. A data repository may reside on-premises, off-premises, in the cloud, or in a combination of two or more of these, sometimes referred to as a hybrid system or a hybrid cloud system. In the present application, "data repository" refers to a repository that is an independent and/or separate and/or external system from the content management system's point of view. Another descriptive term is "external data repository", which may be used interchangeably with "data repository". Further, a centralized content management system, or a part of it, may be a data repository for another centralized content management system from that other centralized content management system's point of view.

It is appreciated that the content management system may comprise one or more internal data structures that act as containers for data that is stored in the content management system. Such structures may be called "internal data storage".

Often a client device has access to several data repositories for different types of data. For example, there can be a data repository for customer relationship management, a data repository for quality-related documents, a data repository for human resources management, a data repository for highly secure and/or sensitive data, a data repository for personal data, a data repository in a cloud system, etc. In addition, different data repositories may be provided by different system providers.

FIG. 1 illustrates a simplified configuration of a content management (CM) system 100 according to an embodiment. The content management system 100 comprises a server 110 and may comprise an internal data storage 115. Instead of the internal data storage 115 or in addition to the internal data storage 115, the content management system 100 can act as an centralized content management system, wherein the system 100 may also comprise a connection to one or more external data repository EXT1. It is appreciated that the nature and the number of data repositories EXT1 can vary in different embodiments. Therefore the present solution is not limited only to the one embodiment being presented by FIG. 1. It is also appreciated that the content management system 100 may contain more than one content management servers 110 and that the content management system may comprise one or more internal data storages 115. The content management system 100 further comprises a client application for a client device (shown in FIG. 6). In addition, the content management system 100 comprises a server application for the server device 110. The client application and the server application are able to communicate with each other.

If the content management system 100 is connected to one or more external data repositories EXT1, as shown in FIG. 1, each data repository EXT1 needs to be integrated and/or connected to the content management system 100. Connecting and/or integrating a data repository EXT1 to the content management system 100 may be achieved by one or more of the following means: a) The content management system 100 may comprise connector components that can interact with the technical interfaces of the data repository EXT1 to access, read, write, delete, modify, process, operate on, and create data in the data repository EXT1; b) The content management system 100 may define technical interfaces that a data repository EXT1 and/or a connector component can implement in order to enable the content management system 100 to access, read, write, delete, modify, and create data in the data repository EXT1 and/or the system or systems with which the connector component interfaces; c) The content management system 100 may connect to and/or integrate with data hubs that provide access to one or more data repositories EXT1 via a unified or partly unified interface or interfaces; d) The content management system 100 may implement in part or in whole an industry-standard interoperability interface that enables the content management system 100 to interface with any data repository EXT1 that implements the industry-standard interoperability interface or an appropriate part of it.

Connection and/or integration of a data repository EXT1 to the content management system 100 may also enable the data repository EXT1 to access, read, write, delete, modify, process, operate on, and create data in the content management system 100 and/or any data repository EXT1 connected and/or integrated to the content management system 100. The content management system 100 may comprise a framework that supports pluggable connector components, making it possible to connect new, previously unsupported data repositories to the content management system 100 by adding an appropriate connector component and configuring the connection, without having to make other changes to the content management system 100.

The present embodiments relate to a method for managing data items being stored in an internal data storage 115 and/or any of the one or more data repositories EXT1. In particular, the method for managing data items relates to determining metadata for a data item automatically, manually or in their combination. In the following examples, the metadata for a data item may be determined at the time a new data item is stored/created in a data storage 115 or one of the one or more data repositories EXT1. The metadata may also be determined for one or more data items at the time a data repository EXT1 is connected to the content management system 100 or after a data repository EXT1 is connected to the content management system 100. The metadata may also be determined for a data item at the time the data item is selected or opened from a data storage 115 or from any of the one or more data repositories EXT1.

The method for determining metadata for a data item is based on a content analysis of the data item.

There are two types of metadata in the related technology. "Traditional" metadata is so called file system metadata that is a standard part of a file system. File system metadata has fixed metadata fields and is often automatically created from information available to the file system. For example, the size of the file, the name of the file, the creator of the file, and last modified by, date created, date modified, etc., are typical examples of file system metadata. At this point, it is worth mentioning that some of the organization's data processing applications make it possible to define other file attributes, e.g., an author, keywords, etc., that are stored within the file. However, these attributes are not considered metadata for the purposes of the present application since they are incorporated within a file and therefore are part of the content. Another reason for such attributes not qualifying as metadata in this application is that the support of those attributes/properties depends on the file format: for instance, attributes/properties are supported for .docx-format files, but not for .txt-format files, since files in the .txt format are not able to store such attributes/properties. File system metadata may comprise, for example, the name of a file and the creator of a file as metadata properties having values "agreement.docx" and "John Smith," respectively.

In addition to file system metadata, there are also business-critical (BC) metadata that are used in enterprise content management systems. Other terms for business-critical metadata are ECM metadata or EIM metadata. BC metadata is more flexible and dynamic than file system metadata, and it is in addition to file system metadata. BC metadata is not dependent on files or file formats: it can be added, created and modified, and instead of being stored in a file system, the BC metadata may be stored in a database that is external to the file system. Still, the content of the file, i.e., file data, may be stored in a file system and not in the database. It is thus appreciated that traditional metadata is stored with the file data in the file system, and BC metadata is stored independently of the file data in a database or other location. BC metadata may comprise, for example, the name of the person who accepted an offer, the term of a contract, the term of an offer, the class or type of a document, and the workflow state of a document as metadata properties having values "Mike Gogh", "13 Nov. 2020", "1 Dec. 2015", "Offer", and "Offer accepted", respectively.

An example of a metadata card comprising BC metadata properties having values is shown in FIG. 2. The metadata card 200 comprises properties Class, Name, Organization, Other party, Starting date, Expiry date, Value, Responsible person, Contact person, and Workflow state having values Agreement, Co-operation, Biz LTD, Plumbers LTD, 1 Jun. 2015, 1 Jun. 2020, 30,000, Mike More, Luke Less, and Signed, respectively.

When content has business-critical metadata, the content can be searched for with a metadata-based search, and other metadata-based operations can be applied to it. Metadata-based search is known to be more precise and faster than e.g. a full-text based search. When content has metadata, the user is able to search for the content by answering questions like "what am I looking for", "which document am I looking for", "who wrote the document", "what type of document is it", "to which project does the document belong", etc., instead of just specifying words to be found from the document.

It is appreciated that the present embodiments for managing data items and determining metadata for data items are particularly for determining business critical metadata for data items.

A process for determining metadata for a data item may begin e.g. when a user navigates in (i.e. browses) an internal data storage 115 or any of the one or more data repositories EXT1, and encounters a document or any other data item that s/he considers important and/or business-critical. Alternatively, the method execution may begin at a time or after a user stores a new data item to an internal data storage 115 or to any of the one or more data repositories EXT1. Yet as a further alternative, the method for determining metadata may begin at a time a content management system is built up and/or one or more data repositories EXT1 are connected to the content management system, whereupon the data items existing in the repositories/storages can be scanned for determining the metadata. Each of these alternatives provides at least one data item to be processed by the content management system in order to the determine metadata for the data item.

The metadata determination according to an embodiment may comprise the following steps: 1) identifying suitable property values from a content of the data item; and 2) filling property values in metadata of a data item.

The first step is preferably performed automatically by using any one or more of the following: text analytics, statistical analysis, natural language processing, machine learning, deep learning, data mining, pattern recognition, neural networks, deep neural networks, image recognition, face recognition. The purpose of the first step is to identify significant text strings or visual data (e.g., images of persons) or graphical data (e.g., logos) from the content of the data item. As an example of a text analysis, the content management system may identify a term "offer" in the content of the file, and then automatically determine that the data item should be classified as an "offer". As another example, the content management system may identify a company name "Plumbers LTD" in the content of the file, and then automatically define an organization property for a data item to have a value "Plumbers LTD". The content management system may also identify any other data, such as key concepts, relationships, dates, sums of money, contact persons, addresses, phone numbers etc. from the content of the file, and use this information to automatically fill in the values of the desired properties. The automatic metadata extraction is therefore about understanding the content, picking content details from the text or other data and determining metadata (properties and/or values) based on the content details. The automatic metadata extraction can be performed on files and other data either one by one (i.e., individually for a file that is being viewed/selected), or the automatic metadata extraction can be performed for multiple files, including in large masses.

The second step (i.e. filling property values in metadata of a data item) may be performed automatically or partly automatically.

When the second step is performed automatically, the metadata values being automatically extracted, derived, or inferred from the content of a file or another data item, or from relationships of data items, are automatically filled in as values for desired properties of metadata of a data item.

When the second step is performed partly automatically, the step comprises forming a set of value suggestions for a property, which set of value suggestions is based on the identified property values obtained from a first step, and comprises one or more value suggestions. The set of value suggestions is displayed to a user, so that the user can select whether any of the value suggestions may be used as a value or values for a desired property.

For example, the content management system may display a metadata card interface as part of a "save" or "store" operation initiated by the user, or the content management system may display a metadata card as a part of "select" or "open" operation of a data item, or when only the metadata card is specifically opened for modification. In the metadata card interface, the content management system may display one or more automatically extracted, derived, or inferred metadata values as "metadata suggestions". The metadata suggestions may be displayed and placed directly in the metadata input fields in such a way that they get stored as BC metadata when the user confirms the save or store operation e.g. by pressing a "Save" or "Create" button in the user interface. Alternatively, the metadata suggestions may be displayed elsewhere in the user interface, typically in the proximity of the corresponding metadata input fields in the user interface, in such a way that they are not stored as BC metadata when the user confirms the save or store operation e.g. by pressing a "Save" or "Create" button in the user interface, unless the user points to one or more of the metadata suggestions or otherwise indicates that the user wishes to confirm a specific metadata suggestion as user-confirmed BC metadata for the content. It is appreciated that this process requires the user to explicitly confirm those metadata suggestions that the user wishes to be stored as BC metadata. This has the advantage of resulting in higher data quality, since the user can pick only the good metadata suggestions and avoid any inappropriate metadata suggestions from being stored as user-confirmed BC metadata.

The user may also indicate, e.g., by means of selecting a context menu command, that a specific metadata suggestion should be discarded and/or marked as invalid. For example, if a text analysis results in suggesting "Washington" as an organization name, the user may want to indicate to the content management system that "Washington" is not an organization and should thus not be suggested as a name of an organization in the future. The content management system may use this information for improving subsequent metadata suggestions, either on a per data item basis, in a similar usage context, or for all data items. This can be referred to as "blacklisting suggestions".

In addition to storing as user-confirmed BC metadata those metadata suggestions that the user explicitly confirms, the content management system may also store one or more of the other metadata suggestions as a specific type of BC metadata that the system can distinguish from user-confirmed BC metadata. This specific type of BC metadata can be described as "automatic BC metadata", while the metadata values confirmed by the user can be described as "user-confirmed BC metadata". This approach enables the content management system to utilize the automatically extracted, derived, or inferred metadata values in various operations, while also avoiding the negative effects of storing potentially lower quality metadata in a way that it cannot be distinguished from user-confirmed BC metadata. This may also be useful in non-interactive use cases, where the content management system runs a background process that creates automatic BC metadata for data items.

According to an embodiment, when the content management system has defined a class to a data item, either automatically or after a confirmation from a user, the defined class may influence on the metadata suggestions being generated for a data item. As an example, when a class Proposal has been defined for a data item, then properties (e.g., Customer, Credit rating, etc.) being pre-defined for the class Proposal are chosen for the data item. The set of metadata suggestions will then be generated according to the predefined properties by using suitable metadata providers. For example, a customer name can be determined based on the content analysis performed on the data item, and the Credit rating can be obtained from a web service provided by a credit rating company by using the customer name as an input. As another example, if the class being selected is Employee Agreement, the predefined metadata properties may comprise Employee, Social security number, Previous employers. The value suggestions for these properties may be obtained by a content analysis performed on the data item (e.g., Employee, Social security number) or by using various metadata providers for additional information from other services, e.g. population register, social media services (e.g., LinkedIn for previous employers).

In the previous example, the class has an influence on which properties the content management system is configured to choose for a data item. This, in turn, has an influence on the metadata suggestions that will be generated. On the other hand, the class may also limit the suggestions being displayed to a user. For example, if the metadata provider produces a large number of suggestions, only such suggestions that relate to the selected class are displayed to a user.

Generation of New Objects from a Metadata Value of a Data Item

The content management system may suggest the creation of new metadata objects as a result of a user confirming a metadata suggestion. For example, when a user stores a new service contract document that mentions "GC Plumbers Inc." in the textual content of the document, the content management system may display the value "GC Plumbers Inc." as a metadata suggestion for a "Contracting party" field, even if "GC Plumbers Inc." is not a known organization object to the content management system or any of its connected data repositories and thus not yet available as a choice in a lookup list of the "Contracting party" field. This may be indicated by a visual clue in the user interface, such as an asterisk before or after the name "GC Plumbers Inc.". If the user confirms using the "GC Plumbers Inc." metadata suggestion as BC metadata, the content management system can initiate the creation of a new organization object.

The new organization object may be created automatically, or may require additional user input. The new organization object may be stored in a specific data repository as any other new content. Once the new organization object has been created, a reference to it can be stored as BC metadata for the service contract document of this example. It is appreciated that the previous is merely an example, and many other kinds of metadata objects can be created based on metadata suggestions.

Figure 3:
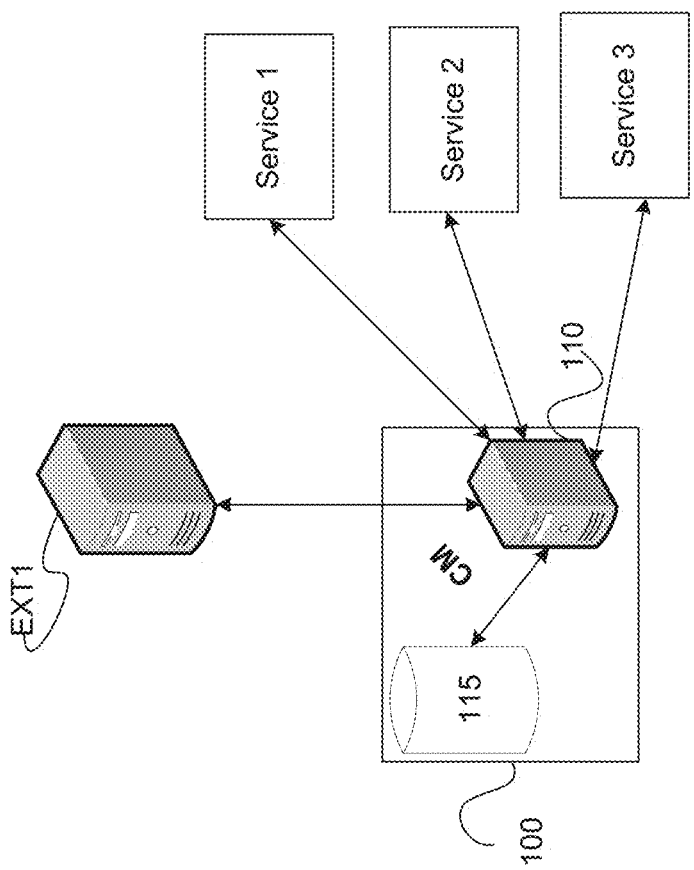
FIG. 3 shows another embodiment of a system in a simplified manner.

As part of the creation of a new metadata object from a metadata suggestion, the content management system may perform one or more additional steps of extracting, deriving, or inferring metadata values based on the metadata suggestion and the related content. This process may include communicating with other services and data sources. An example of a system configuration according to an embodiment is shown in FIG. 3, wherein the content management system 100 is able to communicate with services 1, 2, 3. For example, in the previous example of initiating the creation of a new organization object "GC Plumbers Inc." from the corresponding metadata suggestion, the content management system may communicate with a business contact information catalog service (e.g., service 1 of FIG. 3) in order to retrieve a business ID (Identification), address, telephone, web, email, and/or other contact information related to an organization with the name "GC Plumbers Inc." or similar. Further, the content management system may communicate with a financial information service (e.g., service 2 of FIG. 3) in order to retrieve information on the creditworthiness of "GC Plumbers Inc." based on the business ID retrieved earlier. Further, the content management system may determine the GPS (Global Positioning System) coordinates of an office of "GC Plumbers Inc." by sending the previously retrieved textual address information to a map or location service (e.g., service 3 of FIG. 3) that returns GPS coordinate information. It is appreciated that these are merely examples, and many other types of information can be retrieved from data repositories and/or other systems and/or services in connection with providing metadata suggestions to the user and/or assisted creation of new metadata objects. Metadata suggestions and creation of new metadata objects can also be cascaded/nested, e.g., a metadata suggestion provided to the user as part of the creation of the "GC Plumbers Inc." organization object in the previous example could further result in initiating the creation of yet another metadata object, such as a contact person object for "John Smith" because the creation of new metadata objects has suggested "John Smith" as being CEO (Chief Executive Officer) of "GC Plumbers Inc." Further, the choice of a metadata provider to use may depend on the analysis of content in a previous step and/or on the output provided by another metadata provider. For example, a text analysis on the content of a service contract document may indicate that the document is related to providing services in the United States. In such case, when generating metadata suggestions for the metadata object "GC Plumbers Inc.", the system may choose to use a metadata provider that is suitable for retrieving information on businesses located in the United States. In another example, a text analysis on the content of a service contract document may indicate that the document is related to providing services in Europe. In such case, the system may choose to use a different metadata provider that is suitable for retrieving information on businesses located in one or more European countries.

The content management system comprises a framework for pluggable metadata providers. The framework defines one or more interfaces that the content management system uses to communicate with one or more metadata provider modules. Each metadata provider module knows how to interface with one or more actual systems or services (services 1, 2, 3 of FIG. 3) that can provide useful data for use as metadata suggestions or other automatic metadata. For example, a metadata provider module may receive as input the textual or binary content of a document, file, or other data item, and will return as output metadata values such as recognized named entities like names of organizations, persons, and/or locations identified in the provided input. A metadata provider module may also return as output key concepts, keywords, or a summary of the provided input. Further, a metadata provider may return output that classifies or categorizes the provided input into one or more classes/categories from a set of two or more classes/categories in a binary or multi classification/categorization schema. Further, the metadata provider may use other data sources to return additional information, such as address information when provided the name of an organization, for example.

The content management system may use a combination of more than one metadata providers, and may use one or more metadata providers in a parallel fashion for independently gathering more metadata suggestions than a single metadata provider could generate, or in a cascading fashion, using output from a first metadata provider as input to a second metadata provider. The content management system may also combine output from multiple metadata providers in a way that increases the quality of metadata suggestions, such as including in metadata suggestions only such recognized named entities that more than one metadata providers has returned as output. Metadata providers may additionally return as output a confidence level value and/or post probability for one or more of the provided outputs, in order to inform the content management system of the reliability level of the automatically extracted, derived, or inferred metadata value or classification information.

Example Use Case

Figure 4:
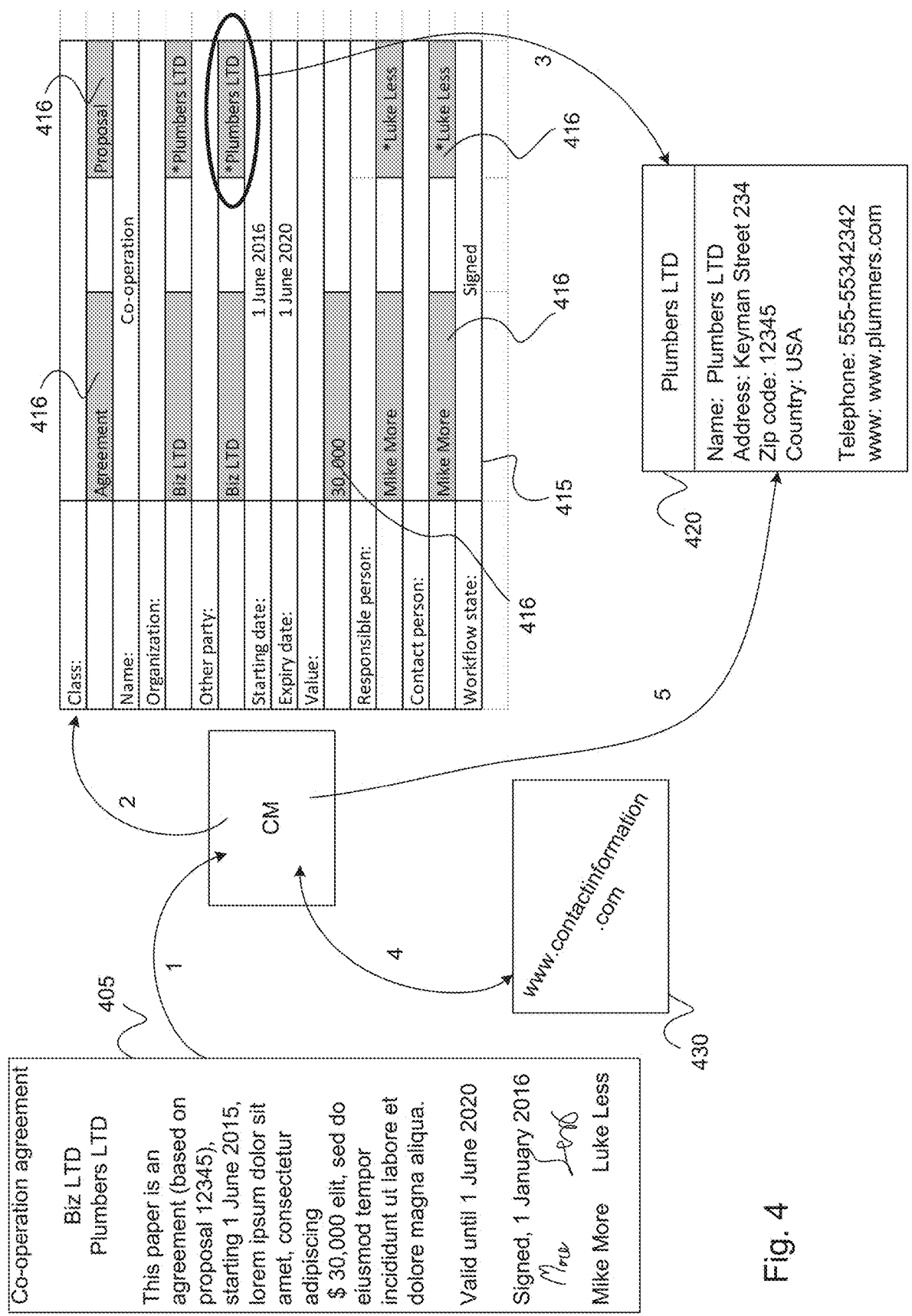
FIG. 4 shows a method according to an embodiment.

FIG. 4 illustrates an example of a use case for determining metadata for a data item. The process of FIG. 4 begins when a user stores 1 (or creates or selects or opens) a data item 405 in a content management system CM. Alternatively, the process may begin when the content management system CM detects a data item in a data storage or in an external data repository. The data item 405 in this example is a document containing textual content. The content management system CM performs or uses an external service to perform text analysis for the content of the data item 405 and generates 2 a metadata card 415 to be displayed to a user. The metadata card 415 may be displayed on a user interface of a client application of the client device.

As shown by FIG. 4, the metadata card is only partially filled with property values. Value fields for properties Class, Organization, Other party, Value, Responsible person, and Contact person are empty, while value fields for properties Name, Starting date, Expiry date, and Workflow state have already been automatically filled. By the text analysis, the content management system is able to identify values for Name, Starting date, Expiry date and Workflow state, and to fill the values to the metadata card 415. However, with respect to the other properties, the content management system gives suggestions 416 to be used as property values. The suggestions are also based on the results of the text analysis, however, they are not directly filled to property value fields. There may be various reasons for that. For example, as shown in FIG. 4, the text analysis may have identified several options for Class (e.g., Agreement and Proposal), for Organization names (e.g. Biz LTD, Plumbers LTD), for Responsible person (e.g. Mike More, Luke Less) and for Contact person (e.g. Mike More, Luke Less), and the content management system may not be able to automatically determine, which one to use as a property value. Therefore, the content management system proposes both options for a user to select. In addition, with respect to the property Value, the content management system also uses suggestion 30,000, which it has determined from the content of the data item 405. The content management system may be configured (i.e., obliged) to always propose a property value when it relates to a sum of money.

The user may confirm any of the suggestions 416 to be used as a value for respective property. For example, the user may select Agreement, Biz LTD, Plumbers LTD, 30,000, Mike More, and Luke Less for properties Class, Organization, Other party, Value, Responsible person, and Contact person respectively.

Often in a content management system persons, organizations, projects etc. also represent objects having their own metadata. Similarly, in the example of FIG. 4, values for Organization, Other party, Responsible person, Contact person are also objects for the content management system. However, when a respective object does not yet exist in the content management system, it may be indicated with an asterisk (e.g. Plumbers LTD, Luke Less). Therefore, when a user selects Plumbers LTD for a property Other party, this causes the content management system to create 3 a new object 420 relating to Plumbers LTD. It is noticed that at the time the new object for Plumbers is created, the content management system does not know any address and/or contact information for Plumbers. However, the content management system is configured to obtain 4 address and/or contact information from a service 430, for example, a web service providing the address and/or the contact information. The address and/or the contact information is filled 5 to the created object 420, after which the created object 420 can be saved to the content management system.

The procedure may be repeated when the user selects Luke Less for property Contact Person. If Luke Less is an employee for the organization Plumbers LTD, some information for Luke Less may be obtained from the object 420 and/or some information may be obtained by utilizing information of the object 420 when contacting e.g. a service 430 or any other service. The relationship between the person object for Luke Less and the organization object Plumbers LTD may be created by defining an organization property for Luke Less having the value Plumbers LTD. Then, for example, a property WWW with the value www-.plumbers.com can be copied to the person object Luke Less. Due to this, work-related contact information for Luke Less can be obtained from a web site of Plumbers LTD by using the address www.plumbers.com by the content management system. This can be implemented in a similar fashion as the contact information for the organization object 420 Plumbers LTD was obtained.

Additionally, the creation of new metadata objects can be nested and/or cascaded. For example, when the user selects Plumbers LTD for the property Other party as previously described, causing the content management system to create 3 a new object 420 to represent Plumbers LTD, the content management system may further retrieve additional metadata suggestions for the new object 420 representing Plumbers LTD, and one or more of these metadata suggestions may again result in the creation of a new object. For example, after obtaining 4 address and/or contact information from a service 430 for the new object 420, part of which may be the web site address www.plumbers.com, the content management system may contact another metadata provider, using the web site address www.plumbers.com as input, in order to retrieve information on the managers and employees of Plumbers LTD from the web site of Plumbers LTD at www.plumbers.com. The metadata provider may return as output information such as "Paul Myers", "Vice President of Sales", and the content management system may use this information to provide a metadata suggestion "Paul Myers" for the user for the Contact person property of the new object 420. If the user selects and/or confirms this suggestion, the content management system creates a new Person object "Paul Myers" and adds a reference to this new Person object to the Contact person property of the new object 420.

As a further embodiment, if a user detects that the contact information for the object 420 Plumbers LTD is incorrect, and should contain contact information for a Finnish subsidiary company, the user may change the value of a property Country to Finland, and perform the automatic filling of contact information again. This repeats the query 4 to the service 430 with an attribute relating to Finland, and returns 5 the contact information of a Finnish subsidiary to object 420. In some embodiments, the determination of the specific country may be based on the language of the content of the data item.

SUMMARY

Previous embodiments disclose extracting metadata values automatically from a content of a data item. The metadata values may be automatically filled to metadata properties of the data item, or may be displayed on a metadata card to a user. When displayed, the user is able to select a suitable property value from the set of suggestions, wherein the selected value will be stored to a respective property. The content management system is able to generate the suggestions based on the textual content of a data item by using one or more metadata provider components.

In addition, new objects can be created from the values being confirmed by the user, and metadata for the new objects may be generated. Also this metadata can be at least partly generated from metadata value suggestions being defined from the content of the data item, or being retrieved from an information service.

As mentioned, the content management system may be connected to one or more external data repositories. In such a solution, the content management system may act as a centralized content management system for all data residing in said connected data repositories. Such a centralized content management system may comprise other functionalities as well. An example of a system configuration relating to a centralized content management system is shown in FIG. 6.

Figure 6:
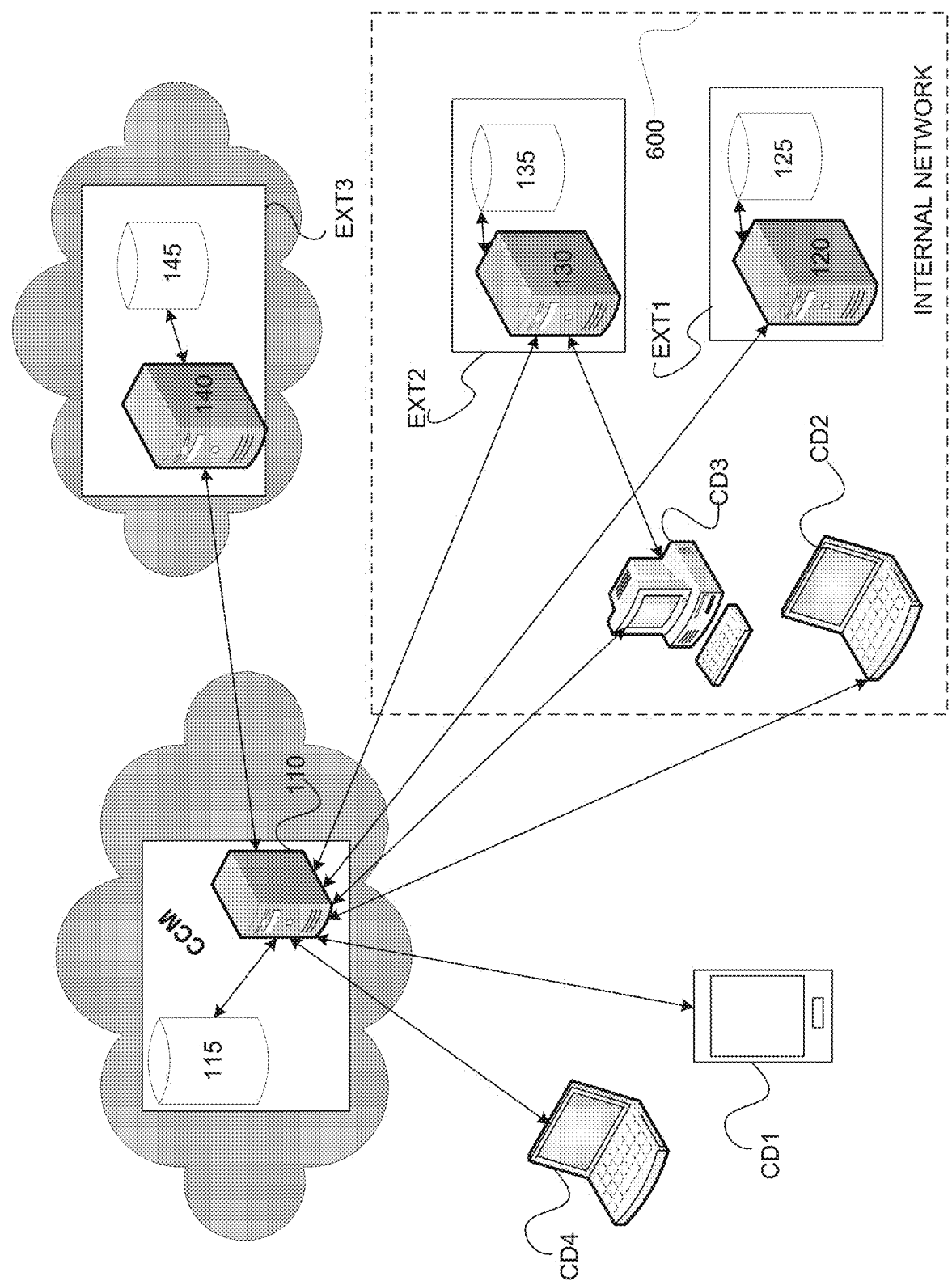
FIG. 6 shows a system according to another embodiment.

The centralized content management system CCM in FIG. 6 comprises a CCM server 110 that is configured to communicate with one or more data repositories EXT1, EXT2, EXT3. The CCM server 110 comprises or is connected to a CCM database 115. The CCM database is configured to store at least CCM metadata for data items residing in any of the connected data repository EXT1, EXT2, EXT3. Each of the one or more data repositories EXT1, EXT2, EXT3 comprises a server 120, 130, 140 and a database 125, 135, 145. Any or any part of the one or more data repositories may be located in a cloud. Client devices CD1, CD2, CD3, CD4 are configured to communicate with the CCM server 110 by means of a CCM client application being stored in the client device. The CCM client application is an application that belongs to the centralized content management system and provides uniform and centralized access for a client device to the connected data storages EXT1, EXT2, EXT3. The client devices CD1, CD2, CD3, CD4 may represent different types of client devices, e.g., a mobile phone, a smart phone, a laptop, a personal computer, a tablet device, etc. Any one or more of the data repositories may be located in a cloud or on-premises. Any one or more of the client devices may be located on an internal network or on an external network. Any communication from/to an internal network goes through the firewall 600.

As shown in the example of FIG. 6, the centralized content management system CCM is located in a cloud (other solutions, where the centralized content management system is on-premises, off-premises, or in a combination of two or more of these, are possible as well). In this embodiment, a client device CD1, CD4 in an external network can directly access the CCM server 110, which in turn can communicate with a data repository EXT1, EXT2 in the internal network via the firewall 600. This makes it possible to allow any client device CD1, CD2, CD3, CD4 an access to any data repository EXT1, EXT2, EXT3 through the centralized content management system. FIG. 6 shows that client devices CD1, CD4 do not have access to data repositories EXT1, EXT2 due to the firewall 600. However, because the centralized content management server 110 is located outside the internal network protected by the firewall 600, the client devices CD1, CD4 are able to access data repositories EXT1, EXT2 via the centralized content management server 110. It is appreciated that this kind of solution is more reasonable, since it is easier and more secure to allow traffic between an internal network and a CCM server 110 than between an internal network and all the client devices outside the internal network.

As was described, the content management system may be used by a client device having a content management client application. The client device can be any electronic device having a memory and at least one processor. Examples of an electronic device include, but are not limited to, a laptop, a personal computer, a tablet device, a smart phone, a mobile phone. It is appreciated that a device with limited displaying and/or user input capabilities (e.g., a mobile phone, a smart phone) will benefit from the present embodiments, since there is no need to type lengthy values to property fields but only to select the most suitable ones.

Figure 5:
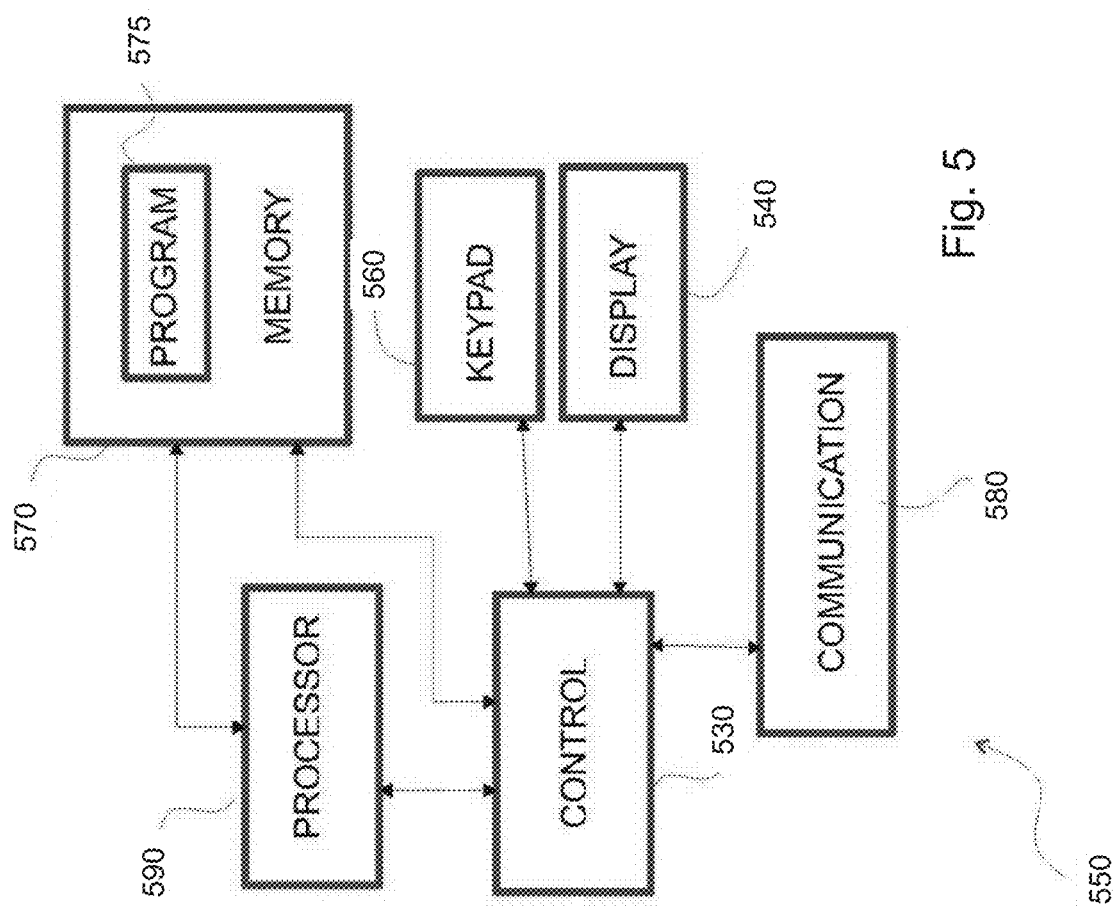
FIG. 5 shows a block chart of an apparatus in a simplified manner.

An apparatus according to an embodiment is illustrated in FIG. 5 in a simplified manner. The apparatus 550 may represent a server or client device or a data repository. The apparatus 550 comprises processing means, such as a processor 590 for processing data. The apparatus 550 further comprises memory means, such as a memory 570, for storing computer program code 575, applications, and various electronic data. The apparatus 550 comprises controlling means, such as a control unit 530, for controlling functions in the apparatus 550. The control unit 530 may run a user interface software to facilitate user control of at least some functions of the apparatus 550. The control unit 530 may also deliver a display command and a switch command to a display 540 to display visual information, e.g., a user interface. The control unit 530 may communicate with the processor 590 and can access the memory 570. Further, the apparatus 550 may comprise input means e.g. in a form of a keypad 560, a keyboard, a stylus, etc. Further, the apparatus 550 comprises various data transfer means, such as a communication block 580 having a transmitter and a receiver for connecting to a network and for sending and receiving information. The communication means can be adapted for telecommunications and/or wide-range and/or short-range communication.

Figure 7:
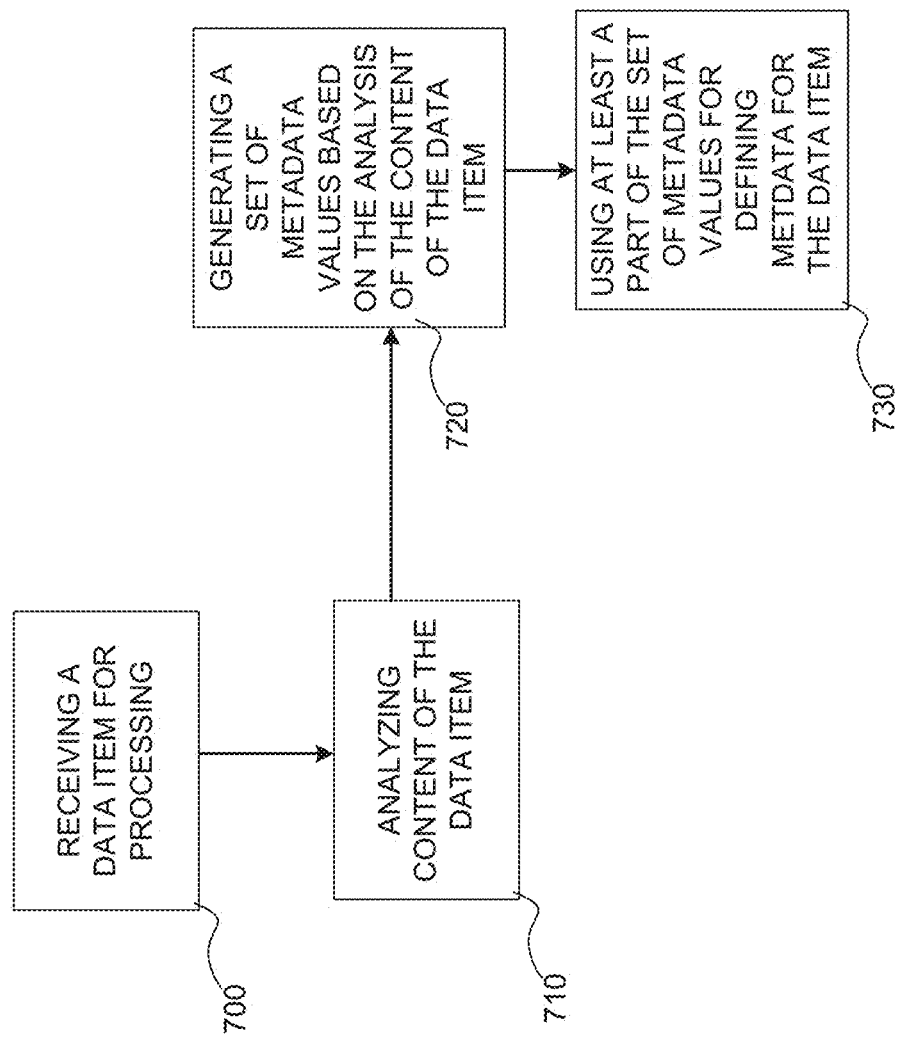
FIG. 7. is a flowchart illustrating a method according to an embodiment.

FIG. 7 is a flowchart illustrating a method according to an embodiment. The method comprises receiving 700 a data item for processing; analyzing 710 content of the data item; generating 720 a set of metadata values based on the analysis of the content of the data item; using 730 at least a part of the set of metadata values for defining metadata for the data item. The content analysis 710 may be targeted to a textual content of the data item or a visual content of the data item. The analysis may be configured to identify text strings in the content of the data item, or to identify a person in the content of the data item based on a face recognition.

An apparatus according to an embodiment is configured to implement a method shown in FIG. 7. The apparatus may also be configured to implement one or more of the embodiments being disclosed in the present application. An apparatus comprises at least a processor and memory including computer code. The code means with the processor are configured to perform the method steps shown in FIG. 7 and one or more of the embodiments of the present application.

The various embodiments of the invention can be implemented with the help of computer program code that resides in a memory and causes the relevant apparatuses to carry out the invention. For example, a device may comprise circuitry and electronics for handling, receiving, and transmitting data, computer program code in a memory, and a processor that, when running the computer program code, causes the device to carry out the features of an embodiment. Further, a network device, such as a server, may comprise circuitry and electronics for handling, receiving, and transmitting data, computer program code in a memory, and a processor that, when running the computer program code, causes the network device to carry out the features of an embodiment.

It is apparent that the present invention is not limited solely to the above-presented embodiments, but it can be modified within the scope of the appended claims.

The invention claimed is:

1. A method, comprising:
   receiving a file for processing;
   analyzing unstructured content of the received file to identify at least one of the following: textual data, visual data, graphical data;
   determining which of the identified data is suitable to be used as at least one metadata property value;
   in response to determining the identified data suitable to be used as at least one metadata property value, determining a metadata property for each identified data that is suitable to be used as a metadata property value;
   generating metadata for the file, wherein the metadata comprises the determined metadata property and its corresponding metadata property value, wherein said corresponding metadata property value has been derived from the identified data.

2. The method according to claim 1, wherein the content of the data item is analyzed by using an external service.

3. The method according to claim 1, further comprising filling at least one metadata value automatically to a property of the generated metadata of the data item.

4. The method according to claim 1, further comprising generating a set of suggestions from at least one metadata value for a property of the generated metadata of the data item.

5. The method according to claim 4, further comprising displaying the set of suggestions to a user.

6. The method according to claim 5, further comprising receiving a confirmation from a user, the confirmation relating to one of the metadata values in said set of the suggestions.

7. The method according to claim 6, further comprising filling said one of the metadata values to a property of the generated metadata of the data item.

8. The method according to claim 1, further comprising creating a new object concerning at least one of the metadata values in said set of metadata values, said new object comprising at least one metadata property.

9. The method according to claim 8, further comprising determining a value for said at least one metadata property by receiving information from an information service.

10. The method according to claim 1, wherein the data item being processed is stored in a data repository connected to the content management system.

11. The method according to claim 1, wherein the data item being processed is stored in an internal data storage of the content management system.

12. The method according to claim 1, wherein the data item being processed is received from a user to be stored in the content management system.

13. An apparatus comprising at least one processor, memory including computer program code, the memory and the computer program code configured to, with the at least one processor, cause the apparatus to perform at least the following:
receive a file for processing;
analyze unstructured content of the received file to identify at least one of the following:
textual data, visual data, graphical data;
determine which of the identified data is suitable to be used as at least one metadata property value;
in response to determining the identified data suitable to be used as at least one metadata property value, determine a metadata property for each identified data;
generate metadata for the file, wherein the metadata comprises the determined metadata property and its corresponding metadata property value, wherein said corresponding metadata property value has been derived from the identified data.

14. The apparatus according to claim 13, wherein the content of the data item is analyzed by using an external service.

15. The apparatus according to claim 13, further comprising computer program code to cause the apparatus to fill at least one metadata value automatically to a property of the generated metadata of the data item.

16. The apparatus according to claim 13, further comprising computer program code to cause the apparatus to generate a set of suggestions from at least one metadata value for a property of the generated metadata of the data item.

17. The apparatus according to claim 16, further comprising computer program code to cause the apparatus to display the set of suggestions to a user.

18. The apparatus according to claim 17, further comprising computer program code to cause the apparatus to receive a confirmation from a user, the confirmation relating to one of the metadata values in said set of the suggestions.

19. The apparatus according to claim 18, further comprising computer program code to cause the apparatus to fill said one of the metadata values to a property of the generated metadata of the data item.

20. The apparatus according to claim 13, further comprising computer program code to cause the apparatus to create a new object concerning at least one of the metadata values in said set of metadata values, said new object comprising at least one metadata property.

21. The apparatus according to claim 20, further comprising computer program code to cause the apparatus to determine a value for said at least one metadata property by receiving information from an information service.

22. The apparatus according to claim 13, wherein the data item being processed is stored in a data repository connected to the content management system.

23. The apparatus according to claim 13, wherein the data item being processed is stored in an internal data storage of the content management system.

24. The apparatus according to claim 13, wherein the data item being processed is received from a user to be stored in the content management system.

25. A computer program product embodied on a non-transitory computer readable medium, comprising computer program code configured to, when executed on at least one processor, cause an apparatus or a system to:
receive a file for processing;
analyze unstructured content of the received file to identify at least one of the following:
textual data, visual data, graphical data;
determine which of the identified data is suitable to be used as at least one metadata property value;
in response to determining the identified data suitable to be used as at least one metadata property value, determine a metadata property for each identified data that is suitable to be used as a metadata property value;
generate a metadata for the file, wherein the metadata comprises the determined metadata property and its corresponding metadata property value, wherein said corresponding metadata property value has been derived from the identified data.

* * * * *